United States Patent
Jung

(10) Patent No.: US 9,799,877 B2
(45) Date of Patent: Oct. 24, 2017

(54) NEGATIVE ELECTRODE ACTIVE MATERIAL LAYER COMPOSITION FOR RECHARGEABLE LITHIUM BATTERY AND METHOD OF PREPARING AND USING THE SAME

(71) Applicant: SAMSUNG SDI CO., LTD., Yongin-si, Gyeonggi-do (KR)

(72) Inventor: Sung-Won Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 71 days.

(21) Appl. No.: 14/522,400

(22) Filed: Oct. 23, 2014

(65) Prior Publication Data

US 2015/0140434 A1 May 21, 2015

(30) Foreign Application Priority Data

Nov. 20, 2013 (KR) .................. 10-2013-0141454

(51) Int. Cl.
*H01M 4/134* (2010.01)
*H01M 4/131* (2010.01)
(Continued)

(52) U.S. Cl.
CPC .......... *H01M 4/131* (2013.01); *H01M 4/364* (2013.01); *H01M 4/625* (2013.01);
(Continued)

(58) Field of Classification Search
CPC .............................. H01M 4/131; H01M 4/134
See application file for complete search history.

(56) References Cited

U.S. PATENT DOCUMENTS

| 6,083,644 A * | 7/2000 | Watanabe ............. | H01M 4/131 |
| | | | 429/218.1 |
| 2002/0068221 A1* | 6/2002 | Watanabe ............... | H01M 2/08 |
| | | | 429/231.5 |

(Continued)

FOREIGN PATENT DOCUMENTS

| EP | 2772969 A1 † | 9/2014 |
| JP | 2005-216601 A | 8/2005 |

(Continued)

OTHER PUBLICATIONS

Chung et al., "Studies on the effects of coated $Li_2CO_3$ on lithium electrode," *Microchemical Journal* 75 (2003) pp. 71-77.
(Continued)

*Primary Examiner* — Olatunji Godo
(74) *Attorney, Agent, or Firm* — Knobbe Martens Olson & Bear LLP

(57) ABSTRACT

A negative electrode active material layer composition for a rechargeable lithium battery is disclosed. The negative electrode active material layer composition includes a negative active material including Li-doped $SiO_x$ (0<x<2), an aqueous binder, and pure water. In addition, a method of manufacturing the negative electrode active material layer composition, and a negative electrode and a rechargeable lithium battery including the same are also disclosed.

10 Claims, 4 Drawing Sheets

(51) Int. Cl.
  *H01M 4/36* (2006.01)
  *H01M 4/02* (2006.01)
  *H01M 4/62* (2006.01)
  *H01M 10/052* (2010.01)
  *H01M 10/0568* (2010.01)

(52) U.S. Cl.
  CPC ...... *H01M 10/052* (2013.01); *H01M 10/0568* (2013.01); *H01M 2004/027* (2013.01)

(56) References Cited

U.S. PATENT DOCUMENTS

| | | | |
|---|---|---|---|
| 2003/0162098 A1* | 8/2003 | Gan | H01M 6/168 429/330 |
| 2005/0191547 A1 | 9/2005 | Konishiike et al. | |
| 2007/0224508 A1* | 9/2007 | Aramata | H01M 4/134 429/231.95 |
| 2011/0244333 A1* | 10/2011 | Kawada | H01M 4/131 429/231.8 |
| 2014/0170485 A1† | 6/2014 | Lee | |

FOREIGN PATENT DOCUMENTS

| | | |
|---|---|---|
| JP | 2012-059504 A | 3/2012 |
| KR | 10-2005-0090219 A | 9/2005 |
| KR | 10-0875605 B1 | 12/2008 |
| KR | 10-2013-0045212 A | 5/2013 |
| WO | 2013/062313 A1 † | 5/2013 |

OTHER PUBLICATIONS

Edström et al., "A new look at the solid electrolyte interphase on graphite anodes in Li-ion batteries," *Journal of Power Sources* 153 (2006) 380-384.

Korean Office Action dated Dec. 21, 2016 for Korean Patent Application No. KR 10-2013-0141454, which cites the above-identified references numbered 1-2, and from which priority is claimed by subject U.S. Appl. No. 14/522,400.

\* cited by examiner
† cited by third party

NEGATIVE ELECTRODE ACTIVE MATERIAL LAYER COMPOSITION FOR RECHARGEABLE LITHIUM BATTERY AND METHOD OF PREPARING AND USING THE SAME

CROSS-REFERENCE TO RELATED APPLICATIONS

Any and all priority claims identified in the Application Data Sheet, or any correction thereto, are hereby incorporated by reference under 37 CFR 1.57. For example, this application claims the benefit of Korean Patent Application No. 10-2013-0141454 filed in the Korean Intellectual Property Office on Nov. 20, 2013, the disclosures of which are incorporated herein by reference in their entirety.

BACKGROUND

Field

The present disclosure relates to a negative electrode active material layer composition for a rechargeable lithium battery, a method of preparing the same, and a rechargeable lithium battery including the same.

Description of the Related Technology

A rechargeable lithium battery has recently drawn attention as a power source for small portable electronic devices. The battery uses an organic electrolyte solution and has a discharge voltage twice or more higher than that of a conventional battery which uses an alkali aqueous solution. Thus, the lithium battery has a high energy density.

As for positive active materials of a rechargeable lithium battery, the lithium-transition metal oxide having a structure capable of intercalating lithium ions, such as $LiCoO_2$, $LiMn_2O_4$, $LiNi_{1-x}Co_xO_2$ (0<x<1), and the like may be used.

The negative active material of a rechargeable lithium battery can include a Si-based negative active material and various carbon-based negative active material such as artificial graphite, natural graphite, and hard carbon. These negative active materials may all intercalate and deintercalate lithium ions.

Since the Si-based negative active material is more irreversible than the carbon-based negative active material, a rechargeable lithium battery including the Si-based negative active material shows lower initial efficiency than a rechargeable lithium battery including the carbon-based negative active material.

In addition, the Si-based negative active material repeatedly expands and contracts during charge and discharge. The occurring swelling phenomenon destroys a SEI (solid electrolyte interphase) film on the surface of the negative electrode. In order to prevent the damage caused by the volume change of the negative active material, a new SEI passivation film is formed, and thus, the SEI layer becomes thick on the surface of the negative electrode. Accordingly, the battery cycle-life characteristics are deteriorated, a space due to volume expansion is limited. The electrolyte may leak due to mechanical stress and further deteriorate the performance of the battery.

Accordingly, development of a Si-based negative active material capable of increasing initial efficiency and increasing cycle-life is required.

SUMMARY OF CERTAIN INVENTIVE ASPECTS

One aspect of the present disclosure relates to a negative electrode active material layer composition for a rechargeable lithium battery, which comprises a negative active material including Li-doped $SiO_x$ (0<x<2); an aqueous binder; and water.

In some embodiments, the negative active material for a rechargeable lithium battery layer composition further comprises $Li_2CO_3$.

In some embodiments, the doping content of Li is in the range of about 0.5 moles to about 1.9 moles relative to 1 mole of the $SiO_x$.

In some embodiments, the surface of the Li-doped $SiO_x$ is coated with carbon.

In some embodiments, the Li-doped $SiO_x$ is included in an amount of about 1 wt % to about 99 wt % by weight based on the total amount of the negative electrode active material layer composition.

In some embodiments, the negative active material further comprises a carbon-based material.

In some embodiments, the carbon-based material comprises natural graphite, artificial graphite, soft carbon, hard carbon, or a combination thereof.

In some embodiments, the carbon-based material is included in an amount of about 1 wt % to about 99 wt % by weight based on the total amount of the negative electrode active material.

In some embodiments, the aqueous binder is a styrene-butadiene rubber (SBR), carboxylmethyl cellulose (CMC), an acrylonitrile-butadiene rubber, an acryl-based resin, hydroxyethyl cellulose, or a combination thereof.

Another aspect of the disclosed technology relates to a method of manufacturing a negative electrode active material layer composition for a rechargeable lithium battery, comprising;
washing the Li-doped $SiO_x$; and
mixing the Li-doped $SiO_x$, an aqueous binder, and water.

In some embodiments, after washing the Li-doped $SiO_x$, $Li_2CO_3$ is formed, and the $Li_2CO_3$ is mixed the Li-doped $SiO_x$, the aqueous binder, and the water.

In some embodiments, the Li-doped $SiO_x$ may be prepared by mixing a lithium compound including $Li_2CO_3$, LiOH or combination thereof, and $SiO_x$ to obtain a mixture, and wherein x is 0<x<2; and firing the mixture under an inert atmosphere to form Li-doped $SiO_x$. The lithium compound is mixed in an amount of about 0.1 parts by mole to about 4.0 parts by mole relative to 1 part by mole of the $SiO_x$.

In some embodiments, the firing is performed at a temperature of about 900° C. to about 1000° C.

In some embodiments, the Li-doped $SiO_x$ is mixed in an amount of about 1 wt % to about 99 wt % based on the total amount of the negative electrode active material layer composition.

In some embodiments, a carbon-based material may be further added to the mixing.

In some embodiments, the carbon-based material is mixed in an amount of about 1 wt % to about 99 wt % based on the total amount of the negative electrode active material.

One more aspect of the present disclosure relates to a rechargeable lithium battery comprising a negative electrode including the negative active material; a positive electrode; and an electrolyte.

In some embodiments, the negative electrode further comprises a SEI (solid electrolyte interphase) protection film on the surface.

In some embodiments, the SEI (solid electrolyte interphase) protection film comprises $Li_2CO_3$.

In some embodiments, the rechargeable lithium battery has a plateau in a discharge capacity region of about 0.4 V to about 0.5 V in a discharge graph of a charge/discharge profile.

DETAILED DESCRIPTION OF CERTAIN INVENTIVE EMBODIMENTS

Figure 1:
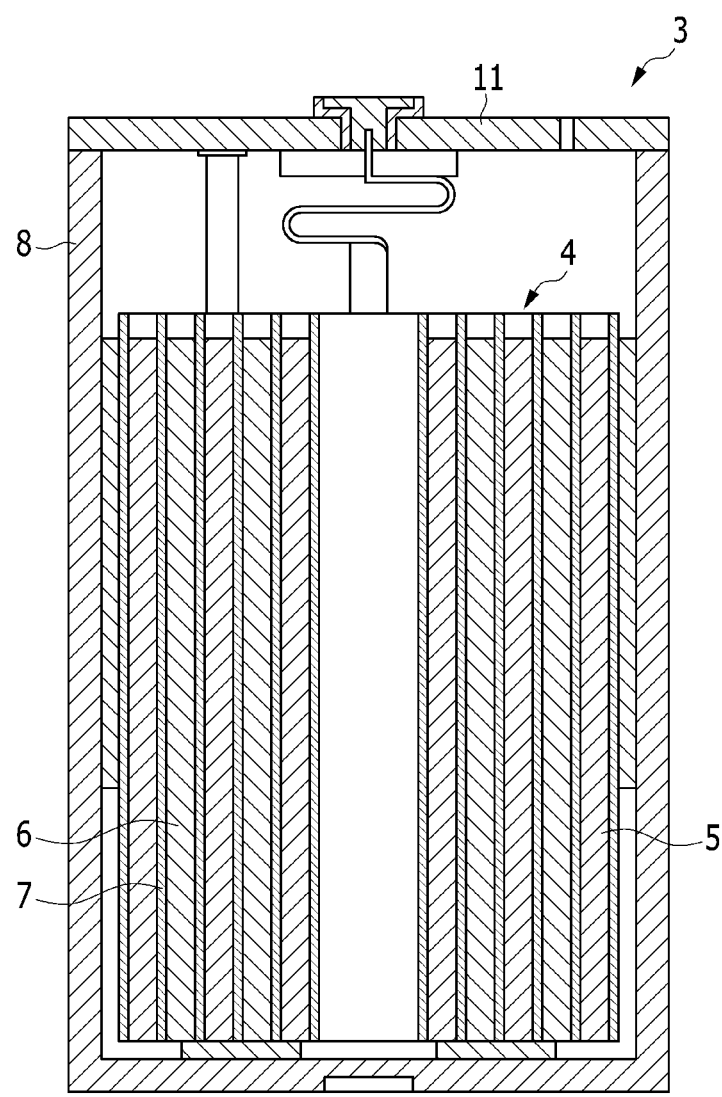
FIG. 1 is a schematic view showing a rechargeable lithium battery.

Hereinafter, embodiments are described in detail. However, these embodiments are exemplary, and this disclosure is not limited thereto.

In some embodiments, a negative electrode active material layer composition includes a negative active material including Li-doped $SiO_x$, and wherein x is an integer between 0 and 2, an aqueous binder, and water.

The negative active material layer composition for a rechargeable lithium battery layer composition may further include $Li_2CO_3$.

The Li-doped $SiO_x$ ($0<x<2$) included in the negative active material may form a $Li_2CO_3$ component under an aqueous condition, and herein, the $Li_2CO_3$ may artificially work as a component forming a SEI protection film on the surface of the negative electrode. In other words, $Li^+$ ions inserted from the positive electrode into the negative electrode is blocked from consumption for forming the SEI protection film, increasing initial efficiency of a rechargeable lithium battery.

The $SiO_x$ ($0<x<2$) may be crystalline, amorphous, or a combination thereof.

The Li may be doped in an amount of about 0.5 moles to about 1.9 moles, and specifically about 0.8 moles to about 1.2 moles relative to 1 mole of the $SiO_x$ ($0<x<2$). When the Li is doped within the range, prelithiation (an effect of producing lithium silicate) may increase.

The surface of the Li-doped $SiO_x$ ($0<x<2$) may be coated with carbon. When the Li-doped $SiO_x$ ($0<x<2$) is coated with carbon on the surface, the reaction of the Li-doped $SiO_x$ with an electrolyte may not only be suppressed but an effect of increasing conductivity and suppressing Si expansion may also be accomplished.

For example, the carbon coating amount may be about 1 wt % to about 25 wt % by weight based on 100 wt % of the Li-doped $SiO_x$ ($0<x<2$).

On the other hand, the Li-doped $SiO_x$ ($0<x<2$) may be included in an amount of about 1 wt % to about 99 wt %, and specifically about 1 wt % to about 50 wt %, based on the total amount of the negative electrode active material layer composition.

The negative active material may further include a carbon-based material, and the carbon-based material may be included in an amount of about 1 wt % to about 99 wt %, and specifically about 50 wt % to about 99 wt %, based on the total amount of the negative active material. When the negative active material is blended with the carbon-based material, capacity per a weight may be adjusted.

For example, when the Li-doped $SiO_x$ may have capacity of about 1200 mAh/g, and the carbon-based material has capacity of about 360 mAh/g.

If 5 wt % of the Li-doped $SiO_x$ is blended with the carbon-based material, capacity of about 400 mAh/g (=1200 mAh/g×0.05+360 mAh/g×0.95) may be obtained.

In some embodiments, the carbon-based material may be, for example natural graphite, artificial graphite, soft carbon, hard carbon, or a combination thereof.

In some embodiments, the aqueous binder may be, for example a styrene-butadiene rubber (SBR), carboxylmethyl cellulose (CMC), an acrylonitrile-butadiene rubber, an acryl-based resin, hydroxyethyl cellulose, or a combination thereof.

The aqueous binder may be included in an amount of about 1 wt % to about 30 wt %, and specifically about 1 wt % to about 2 wt %, based on the total amount of the negative electrode active material layer composition.

When the above composition is within the above ratios, excellent initial efficiency and rate capability may be obtained.

A method of preparing a negative electrode active material layer composition includes washing a Li-doped $SiO_x$ ($0<x<2$), and evaporating residuary water, and mixing the Li-doped $SiO_x$ ($0<x<2$), an aqueous binder, and water.

The washing process may be performed by washing the Li-doped $SiO_x$ with water, citric acid, or a combination thereof.

The Li-doped $SiO_x$ may be prepared by mixing a lithium compound including $Li_2CO_3$, LiOH, or a combination thereof, with $SiO_x$ ($0<x<2$) to obtain a mixture, and firing the mixture under an inert atmosphere to form Li-doped $SiO_x$ ($0<x<2$).

During the preparation, the lithium compound, especially, $Li_2CO_3$ may be not reacted, so the reacted $Li_2CO_3$ may be remained, or during the washing process, $Li_2CO_3$ may be formed. Thus, such $Li_2CO_3$ may be presented in the mixing process of Li-doped $SiO_x$ ($0<x<2$), an aqueous binder and water.

In the forming process of the Li-doped $SiO_x$ ($0<x<2$), the lithium compound may be mixed in an amount of about 0.1 parts by mole to about 4.0 parts by mole relative to 1 part by mole of the $SiO_x$ ($0<x<2$) so that the doping content of Li may be about 0.9 moles to about 1.2 moles.

The firing may be performed at a temperature in the range of about 900° C. to about 1000° C. When the Li-doped $SiO_x$ ($0<x<2$) is fired at a temperature in the range of about 900° C. to about 1000° C., an effect of decreasing irreversibility during a formation step, that is, a prelithiation effect may be observed, since Li is present in the negative electrode before the formation step.

When an aqueous binder is used, a separate process for preventing a side reaction due to the remaining Li, for example, a filtering process for removing impurities and the like may be performed.

However, the preparation method may include mixing a Li-doped $SiO_x$ active material with an aqueous binder after washing the Li-doped $SiO_x$ active material with water and drying it without additional filtering to remove only the residual water.

In the washing process of washing the Li-doped $SiO_x$ active material with water, $Li_2CO_3$ is formed and dried without filtering and thus $Li_2CO_3$ is present in the negative electrode active material layer composition. In other words, the $Li_2CO_3$ present in the negative electrode active material layer composition may form a SEI protection film on the surface of the negative electrode, and the SEI protection film may increase initial efficiency of a rechargeable lithium battery.

The negative electrode for a rechargeable lithium battery 112 may include a current collector and a negative active material layer formed with the above negative electrode active material layer composition on the current collector.

In some embodiments, the current collector may include a copper foil, a nickel foil, a stainless steel foil, a titanium foil, a nickel foam, a copper foam, a polymer substrate coated with a conductive metal, or a combination thereof.

In some embodiments, the negative active material layer is formed with the above negative electrode active material layer composition.

The negative active material layer may optionally include a conductive material.

The conductive material helps to increase the conductivity of an electrode. Any electrically conductive material may be used as a conductive material, unless the material causes a chemical change. Examples of the conductive material may be natural graphite, artificial graphite, carbon black, acetylene black, ketjen black, a carbon fiber, a metal powder, a metal fiber, and the like of copper, nickel, aluminum, silver, and the like, and a conductive material such as a polyphenylene derivative and the like may be mixed.

In another embodiment, a rechargeable lithium battery including the negative electrode, a positive electrode, and an electrolyte is provided.

A rechargeable lithium battery can be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shape. In addition, it can be bulk type and thin film type depending on size. Structures and manufacturing methods for lithium ion batteries pertaining to this instant embodiments are well known in the art.

A rechargeable lithium battery is described referring to FIG. 1.

Referring to FIG. 1, the rechargeable lithium battery 3 is a prismatic type battery that includes an electrode assembly 4 having a positive electrode 5, a negative electrode 6, and a separator 7 disposed between the positive electrode 5 and negative electrode 6 in a battery case 8, an electrolyte injected through the upper side of the battery case 8, and a cap plate 11 sealing the battery case 8. The rechargeable lithium battery described herein is not limited to a prismatic type of rechargeable lithium battery, and it may be formed in diverse forms such as a cylindrical form, a coin-type form, or a pouch form.

The negative electrode 6 may further include a SEI protection film on the surface, and the SEI protection film may include $Li_2CO_3$.

The SEI protection film is further formed on the surface of the negative electrode and thus, may much more increase initial efficiency.

Particularly, the rechargeable lithium battery may have a plateau in a discharge graph of charge discharge profile due to the Li-doped $SiO_x$.

In some embodiments, the plateau indicates a flat part without an ascent or a descent in a curved line of a graph, specifically, a rechargeable lithium battery shows a plateau in a region of about 0.4 V to about 0.5 V based on a half-cell and a region of about 3.0 V to about 3.5 V based on a full cell, showing that the Li-doped $SiO_x$ is present therein.

The positive electrode may include a positive current collector and a positive active material layer formed on the positive current collector.

The positive active material may include lithiated intercalation compounds that reversibly intercalate and deintercalate lithium ions. Specifically, at least one composite oxide of lithium and a metal of cobalt, manganese, nickel, or a combination thereof may be used, and specific examples thereof may be a compound represented by one of the following chemical formulae. $Li_aA_{1-b}R_bD_2$ (0.90≤a≤1.8 and 0≤b≤0.5); $Li_aE_{1-b}R_bO_{2-c}D_c$ (0.90≤a≤1.8, 0≤b≤0.5 and 0≤c≤0.05); $Li_aE_{2-b}R_bO_{4-c}D_c$ (0.90≤a≤1.8, 0≤b≤0.5, 0≤c≤0.05); $Li_aNi_{1-b-c}Co_bR_cD_\alpha$ (0.90≤a≤1.8, 0≤b≤0.5, 0≤c≤0.05 and 0<α≤2); $Li_aNi_{1-b-c}Co_bR_cO_{2-\alpha}Z_\alpha$ (0.90≤a≤1.8, 0≤b≤0.5, 0≤c≤0.05 and 0<α<2); $Li_aNi_{1-b-c}Co_bR_cO_{2-\alpha}Z_2$ (0.90≤a≤1.8, 0≤b≤0.5, 0≤c≤0.05 and 0<α<2); $Li_aNi_{1-b-c}Mn_bR_cD_\alpha$ (0.90≤a≤1.8, 0≤b≤0.5, 0≤c≤0.05 and 0<α≤2); $Li_aNi_{1-b-c}Mn_bR_cO_{2-\alpha}Z_\alpha$ (0.90≤a≤1.8, 0≤b≤0.5, 0≤c≤0.05 and 0<α<2); $Li_aNi_{1-b-c}Mn_bR_cO_{2-\alpha}Z_2$ (0.90≤a≤1.8, 0≤b≤0.5, 0≤c≤0.05 and 0<α<2); $Li_aNi_bE_cG_dO_2$ (0.90≤a≤1.8, 0≤b≤0.9, 0≤c≤0.5 and 0.001≤d≤0.1); $Li_aNi_bCo_cMn_dGeO_2$ (0.90≤a≤1.8, 0≤b≤0.9, 0≤c≤0.5, 0≤d≤0.5 and 0.001≤e≤0.1); $Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

In some embodiments, the positive active material may include the positive active material with the coating layer, or a compound of the active material and the active material coated with the coating layer. The coating layer may include a coating element compound of an oxide of a coating element, hydroxide of a coating element, oxyhydroxide of a coating element, oxycarbonate of a coating element, or hydroxycarbonate of a coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any conventional processes as long as it does not causes any detrimental side effects on the properties of the positive active material (e.g., spray coating, immersing), which is well known to persons having ordinary skill in this art, so a detailed description thereof is omitted.

The positive active material layer includes a binder and a conductive material.

The binder increases binding properties of positive active material particles with one another and with a current collector. Examples of the bonder may be polyvinyl alcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material increases electrical conductivity of an electrode. Any electrically conductive material may be used as a conductive material, unless it causes a chemical change. Examples thereof may be one or more of natural graphite, artificial graphite, carbon black, acetylene black, ketjen black, a carbon fiber, a metal powder, a metal fiber, and the like of copper, nickel, aluminum, silver, and the like, a conductive material such as a polyphenylene derivative and the like.

The current collector may include Al, but is not limited thereto.

In some embodiments, the negative electrode and the positive electrode may be manufactured by mixing an active material, a conductive material, and a binder in a solvent to prepare an active material composition, and coating the composition on a current collector. The electrode manufacturing method is well known, and thus is not described in detail in the present specification. The solvent includes N-methylpyrrolidone and the like, but is not limited thereto.

The electrolyte includes a non-aqueous organic solvent and a lithium salt.

The non-aqueous organic solvent serves as a medium for transmitting ions taking part in the electrochemical reaction of a battery.

In some embodiments, the non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like, and the ketone-based solvent may include cyclohexanone, and the like. The alcohol-based solvent may include ethanol, isopropyl alcohol, and the like, and the aprotic solvent may include nitriles such as R—CN (R is a hydrocarbon group having a C2 to C20 linear, branched, or cyclic structure, and may include a double bond, an aromatic ring, or an ether bond) and the like, amides such as dimethylformamide and the like, dioxolanes such as 1,3-dioxolane and the like, sulfolanes, and the like.

The non-aqueous organic solvent may be used singularly or in a mixture. When the organic solvent is used in a mixture, the mixture ratio may be controlled in accordance with a desirable battery performance.

In some embodiments, the carbonate-based solvent is prepared by mixing a cyclic carbonate and a linear carbonate. The cyclic carbonate and the linear carbonate are mixed together in the volume ratio of about 1:1 to about 1:9. Within this range, performance of electrolyte may be improved.

In some embodiments, the non-aqueous organic electrolyte may be further prepared by mixing a carbonate-based solvent with an aromatic hydrocarbon-based solvent. The carbonate-based and the aromatic hydrocarbon-based solvents may be mixed together in a volume ratio ranging from about 1:1 to about 30:1.

The aromatic hydrocarbon-based organic solvent may be an aromatic hydrocarbon-based compound represented by the following Chemical Formula 1.

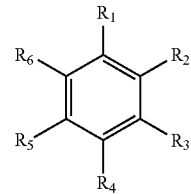

Chemical Formula 1

In the above Chemical Formula 1, $R_1$ to $R_6$ are each independently hydrogen, halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In order to increase the battery cycle-life, the non-aqueous electrolyte may further include vinylene carbonate or an ethylene carbonate-based compound of the following Chemical Formula 2.

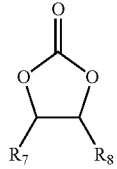

Chemical Formula 2

In the above Chemical Formula 2, $R_7$ and $R_8$ are each independently hydrogen, a halogen, a cyano group (CN), a nitro group ($NO_2$), or a C1 to C5 fluoroalkyl group, wherein at least one of the $R_7$ and $R_8$ is a halogen, a cyano group (CN), a nitro group ($NO_2$), or a C1 to C5 fluoroalkyl group.

Examples of the ethylene carbonate-based compound are difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate range.

The lithium salt is dissolved in an organic solvent, supplies lithium ions in a battery, operates a basic operation of the rechargeable lithium battery, and increases the lithium ion transportation between positive and negative electrodes therein. Examples of the lithium salt may be $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$ (lithium bis(oxalato)borate; LiBOB) or a combination thereof, which is used as a supporting electrolytic salt. The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

The separator may be, for example, selected from a glass fiber, polyester, TEFLON (tetrafluoroethylene), polyethylene, polypropylene, polytetrafluoroethylene (PTFE), or a combination thereof. The separator may have a form of a non-woven fabric or a woven fabric. For example, for the lithium ion battery, polyolefin-based polymer separator such as polyethylene, polypropylene or the like is mainly used. In order to ensure the heat resistance or mechanical strength, a coated separator including a ceramic component or a polymer material may be used. Selectively, it may have a mono-layered or multi-layered structure.

Hereinafter an examples of the present invention and comparative examples are described. These examples, however, should not in any sense be interpreted as limiting the scope of the present invention.

Example 1

Manufacture of Negative Electrode Active Material Layer Composition and Negative Electrode 2.36 wt % of Li-doped $SiO_x$ (Osaka Titanium Technologies Co., Ltd, Osaka, Japan) was mixed with pure water, and the pure water was evaporated without filtering to form $Li_2CO_3$.

The Li-doped $SiO_x$, the $Li_2CO_3$, 44.9 wt % of graphite, 0.48 wt % of carboxylmethyl cellulose (CMC) as an aqueous binder, 1.82 wt % of a styrene-butadiene rubber (SBR), and pure water (a balance: 50.44 wt %) were mixed to prepare a negative electrode active material layer composition.

The negative electrode active material layer composition was coated on a Cu-foil current collector, dried, and compressed to make a negative electrode.

Comparative Example 1

A negative electrode was manufactured in accordance with the same method described in Example 1 except that the negative electrode active material layer composition was prepared by mixing 1.42 wt % of $SiO_x$ doped with no Li (x=1, Osaka Titanium Technologies Co., Ltd, Osaka, Japan), 45.85 wt % of graphite, 0.48 wt % of CMC, 1.00 wt % of a styrene-butadiene rubber (SBR), and pure water (a balance: 51.25 wt %).

Comparative Example 2

A negative electrode was manufactured in accordance with the same method described in Example 1 except that the negative electrode active material layer composition was prepared by mixing 80 wt % of $SiO_x$ not doped with Li (Osaka Titanium Technologies Co., Ltd), 5 wt % of a conductive material (ketjen black-EC 600 JD, 99.9% of purity, Ilshin Chemtech CO. Ltd Seoul, Korea), and 15 wt % of polyamide imide (PAI) as an organic binder in an N-methyl-2-pyrrolidone solvent.

Evaluation 1: Initial Efficiency of Rechargeable Lithium Battery Cell

Initial efficiency of the rechargeable lithium battery cells made in Example 1 and Comparative Examples 1 and 2 were measured, and the results are provided in the following Table 1 and FIGS. 2 to 4.

Figure 2:
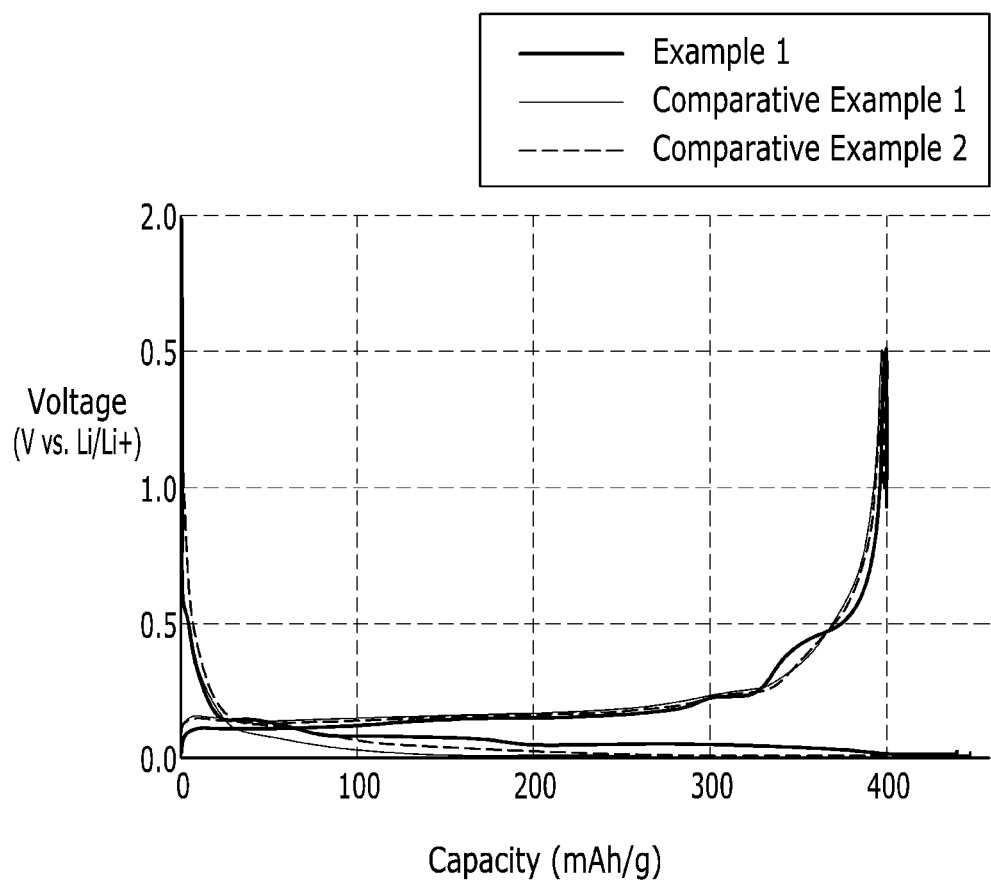
FIGS. 2 and 3 are graphs showing charge discharge profiles of the rechargeable lithium battery cells according to Example 1 and Comparative Examples 1 and 2.
Figure 3:
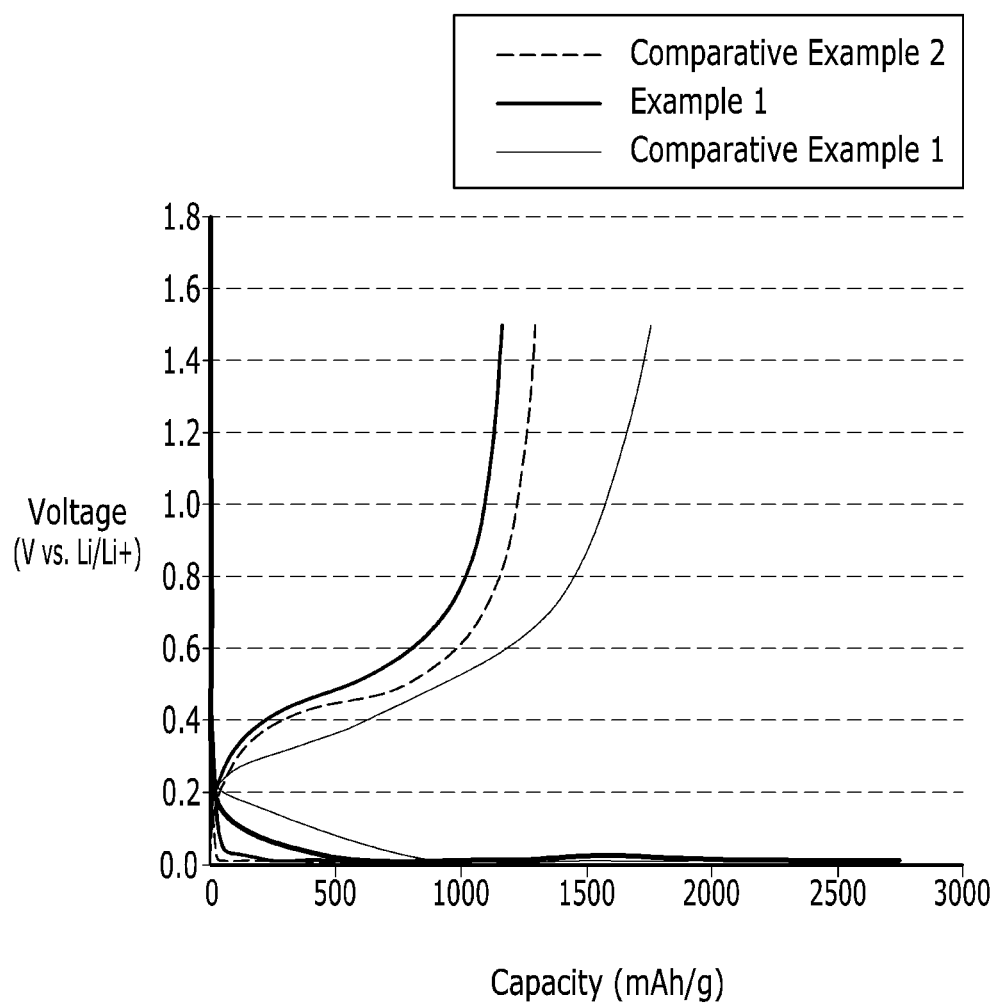

FIGS. 2 and 3 are graphs showing charge and discharge profiles of the rechargeable lithium battery cells made in Example 1 and Comparative Examples 1 and 2.

Figure 4:
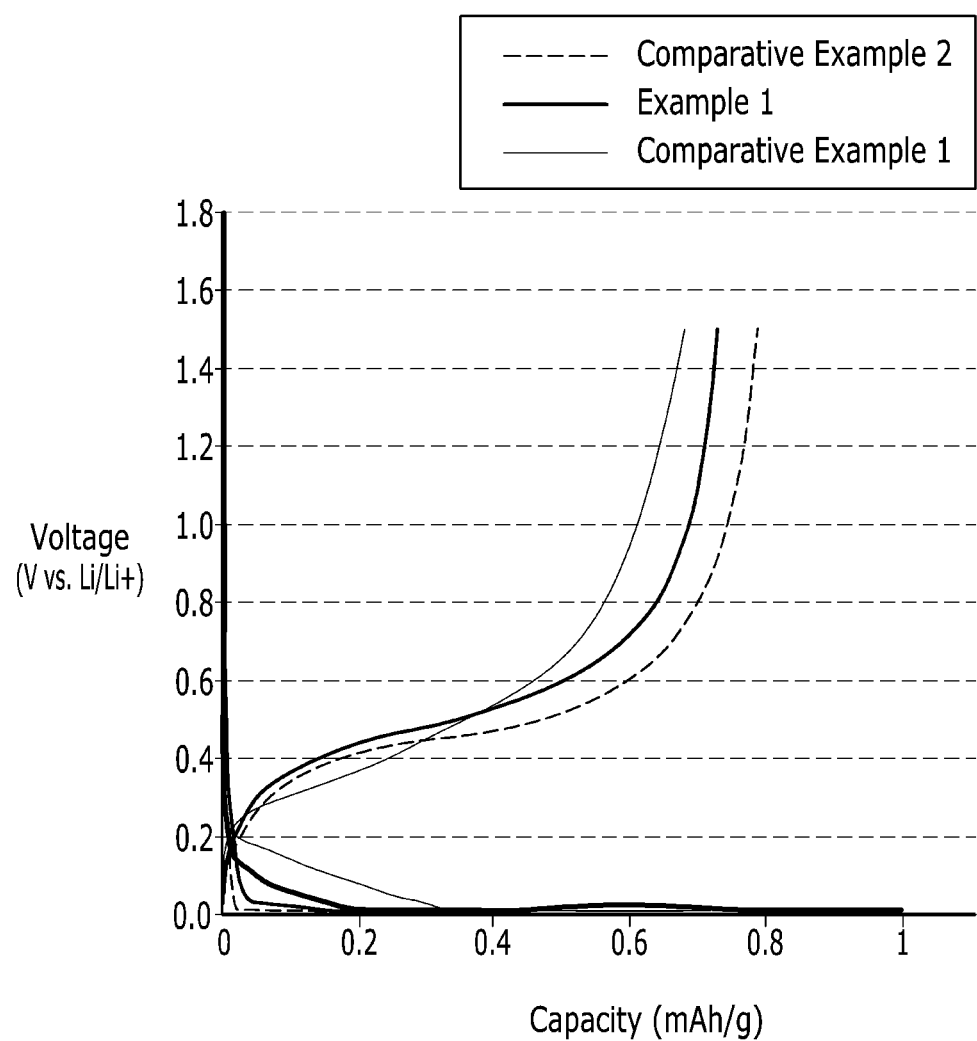
FIG. 4 is a graph normalizing the charge discharge profile.

FIG. 4 shows a normalized graph of the charge discharge profile.

The negative electrode and the metal lithium as a counter electrode were used to manufacture a button type half-cell. Herein, an electrolyte was prepared by mixing ethylene carbonate (EC) and dimethyl carbonate (DMC) in a volume ratio of 3:7 and dissolving $LiPF_6$ in a concentration of 1.3 M in the mixed solution.

The lithium rechargeable battery cells were charged (Li insertion) under a constant current (0.1 C of cut-off, 0.01 V) and a constant voltage (0.01 V, 0.02 C of cut-off) and discharged (Li extraction) at a constant current (0.1 C of cut-off, 1.5 V), and then, initial efficiency thereof was measured to calculate 'charge capacity/discharge capacity'.

As shown in Table 1, the lithium rechargeable battery cell made in Example 1 showed initial efficiency of greater than or equal to 90% and excellent initial efficiency compared with the lithium rechargeable battery cells made in Comparative Examples 1 and 2.

TABLE 1

|  | Example 1 | Comparative Example 1 | Comparative Example 2 |
|---|---|---|---|
| Initial efficiency (%) | 90.3 | 88.3 | 79 |

Evaluation 2: Rate Capability of Rechargeable Lithium Battery Cell

Rate capability of the rechargeable lithium battery cells made in Example 1 and Comparative Examples 1 and 2 were evaluated, and the results are provided in the following Table 2.

Then, 2 C/0.2 C rate capability of the rechargeable lithium battery cells made in Example 1 and Comparative Examples 1 and 2 was calculated by measuring discharge capacity thereof after charging the cells in a CC-CV mode at a rate of 0.2 C and setting a cut-off voltage at 0.01V (0.01 C) and then, discharging them down to 1.5V in a CC mode at a rate of 0.2 C and also, measuring discharge capacity by charging them in a CC-CV mode at a rate of 0.2 C and setting a cut-off voltage at a 0.01V (0.01 C) and then, discharging them down to 1.5V in a CC mode at a rate of 2 C.

Referring to Table 2, the rechargeable lithium battery cell made in Example 1 maintained higher rate capability than the rechargeable lithium battery cells according to Comparative Examples 1 and 2.

TABLE 2

|  | Example 1 | Comparative Example 1 | Comparative Example 2 |
|---|---|---|---|
| Rate capability (%) (2 C/0.2 C) | 96 | 75 | 76 |

Evaluation 3: Plateau in Region of about 0.4 V to about 0.5 V During Discharge (Li Extraction) of Rechargeable Lithium Battery Cell Initial efficiency of the rechargeable lithium battery cell made in Example 1 and Comparative Example 1 was measured, and the results are provided in the following FIG. 2.

Referring to FIG. 2, the rechargeable lithium battery cell made in Example 1 showed a plateau in a region of 0.4 V to 0.5 V and that $SiO_x$ was doped with Li.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative electrode active material layer composition for a rechargeable lithium battery, comprising;
   a negative active material including Li-doped $SiO_x$, (0<x<2);
   an aqueous binder;
   a carbon-based material; and
   water,
   wherein the doping content of Li is in the range of about 0.5 moles to about 1.2 moles relative to 1 mole of $SiO_x$, and wherein the negative active material further comprises $Li_2CO_3$; and
   wherein the carbon-based material is included in an amount of about 44.9 wt % to about 99 wt % by weight based on the total amount of the negative electrode active material layer composition.

2. The negative active material of claim 1, wherein the doping content of Li is in the range of about 0.8 moles to about 1.2 moles relative to 1 mole of the $SiO_x$.

3. The negative active material of claim 1, wherein a surface of the Li doped $SiO_x$ is coated with carbon.

4. The negative active material of claim 1, wherein the Li doped $SiO_x$ is included in an amount of about 1 wt % to about 99 wt % by weight based on the total amount of the negative electrode active material layer composition.

5. The negative active material of claim 1, wherein the carbon-based material comprises natural graphite, artificial graphite, soft carbon, hard carbon, or a combination thereof.

6. The negative active material of claim 1, wherein the aqueous binder is a styrene-butadiene rubber (SBR), carboxylmethyl cellulose (CMC), an acrylonitrile-butadiene rubber, an acryl-based resin, hydroxyethyl cellulose, or a combination thereof.

7. A rechargeable lithium battery comprising
   a negative electrode comprising the negative active material of claim 1;
   a positive electrode; and
   an electrolyte.

8. The rechargeable lithium battery of claim 7, wherein the negative electrode further comprises a solid electrolyte interphase protection film on the surface.

9. The rechargeable lithium battery of claim 8, wherein the solid electrolyte interphase protection film comprises $Li_2CO_3$.

10. The rechargeable lithium battery of claim 7, wherein the rechargeable lithium battery has a plateau in a discharge capacity region of about 0.4 V to about 0.5 V in a discharge graph of a charge/discharge profile.

* * * * *